No. 760,170. PATENTED MAY 17, 1904.
J. E. ACKERMAN.
THILL OR POLE COUPLING.
APPLICATION FILED MAR. 1, 1904.
NO MODEL.
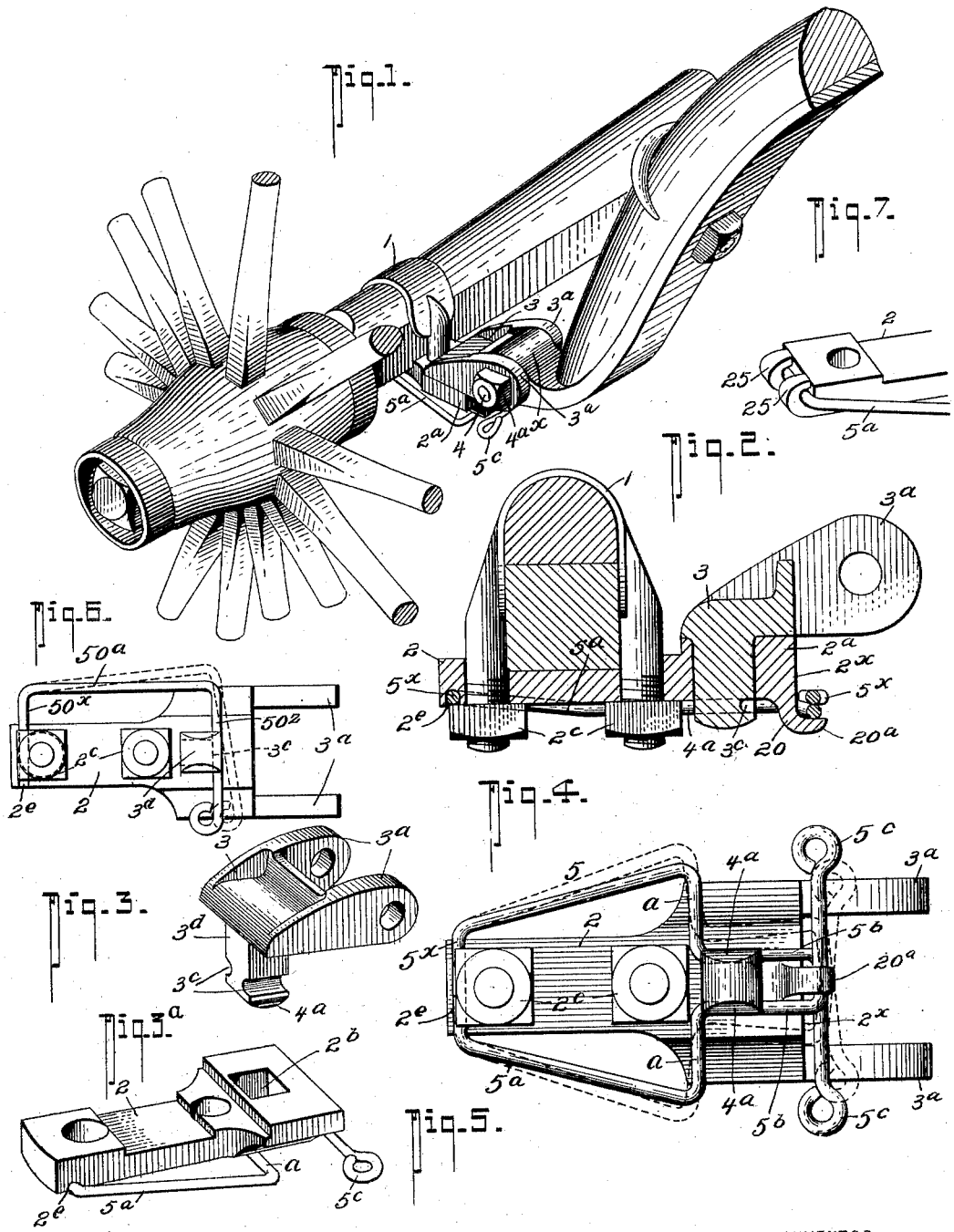
WITNESSES:
F. C. Gibson.
J. T. Schrott.
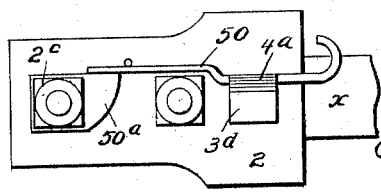
INVENTOR
Joel E. Ackerman
BY
Fred G. Dieterich & Co.
ATTORNEYS No. 760,170. Patented May 17, 1904.

UNITED STATES PATENT OFFICE.

JOEL E. ACKERMAN, OF TOMAH, WISCONSIN, ASSIGNOR TO THE TWENTIETH CENTURY CO., OF TOMAH, WISCONSIN, A CORPORATION.

THILL OR POLE COUPLING.

SPECIFICATION forming part of Letters Patent No. 760,170, dated May 17, 1904.

Application filed March 1, 1904. Serial No. 196,023. (No model.)

*To all whom it may concern:*

Be it known that I, JOEL E. ACKERMAN, residing at Tomah, in the county of Monroe and State of Wisconsin, have invented a new and Improved Thill or Pole Coupling, of which the following is a specification.

This invention is in the nature of an improved construction of coupling device for removably securing vehicle thills or poles to the axles; and it particularly seeks to provide certain improvements in that form of thill and pole couplings disclosed by my Patent No. 718,893, dated January 20, 1903.

My present invention comprehends a locking-spring member having such peculiar construction and coöperative arrangement with the clip member and the aperture in the said clip member that receives the stud or pintle of the removable coupling member whereby when the pintle or stud of the said coupling member is inserted in the aperture of the coupling member that is fixedly connected to the axle the interlocking action of the pintle or stud with the locking-spring is rendered absolutely positive and automatic, and the operation of adjusting the locking-spring to disengage the stud to permit of removing the coupling member can be conveniently and expeditiously done.

My present invention consists in the peculiar arrangement and combination of parts, which will be hereinafter explained, specifically pointed out in the appended claims, and illustrated in the accompanying drawings, in which—

Figure 1 is a view which illustrates my invention as in use. Fig. 2 is a longitudinal section of the same. Figs. 3 and 3ª are perspective views of my improved coupling device, the parts being separated. Fig. 4 is an inverted plan view thereof, the locking-spring being shown disengaged from the pintle or stud member in dotted lines. Fig. 5 is a view of the modified arrangement of my invention, which will be hereinafter referred to. Fig. 6 is a plan view of a further modification of my invention. Fig. 7 is a detail view illustrating a modified means of pivotally connecting the spring member 5, hereinafter referred to.

In the drawings the axle-clip 1 is of the usual construction, and the same connects with the base-piece or clip member 2 and is secured to the same by the nuts $2^c$, as clearly shown in Fig. 3, by reference to which it will be noticed that the said clip member is extended, as at $2^a$, and the said extension provided with a square aperture $2^b$, the purpose of which will presently appear.

The thill or pole holder 3 is provided with upwardly-extended apertured ears $3^a$ $3^a$ to receive the apertured end $x$ of the pole or thill (see Figs. 1 and 3) and the pivoted bolt 4, which is made fast by the nut $4^a$ in the usual manner. The holder 3 is also cast with a pendent spindle or stud $3^d$, which is square in cross-section and of a size to snugly fit within the aperture $2^b$ in the part 2 to prevent rattling. The lower end of the spindle or stud has beveled edges $4^n$ to facilitate the action of forcing the lower end of the stud into an interlocked engagement with the locking device presently referred to, whereby to maintain the axle, the clip, and the holder in a proper connected condition and from separating by the jolt of the vehicle.

In the preferred form of my present invention the locking device 5 consists of a stout spring-wire bent to form a U-shaped portion $5^a$, whose ends are bent inwardly at right angles to the side portions $a$ $a$ and then forward to produce parallel side members $5^b$ $5^b$, which are adapted to straddle the lower projected or beveled end $3^d$ of the spindle or stud of the holder 3.

The locking-spring 5 in my present form of thill and pole coupling is held to lie flatwise against the bottom of the clip member 2, and at one end it is secured by one of the clip-securing nuts $2^c$, which engages the cross member $5^x$ of the U-shaped portion $5^a$, and which portion is held from endwise movement by reason of its engaging the transverse seat or depression $2^e$ in the under side of the clip member 2, as shown in Fig. 2. The spring-lock 5 has its ends bent across each other to form finger members $5^c$, and the said lock 5 is of such length with respect to the clip portion 2 that the said members $5^c$ are disposed in advance of the front end 2$^x$ of the said portion 2, and the said members 5$^c$ are projected laterally a distance sufficient to extend beyond the sides of the clip member 2, and they have their extremities rounded for conveniently pressing the free ends of the said members 5$^c$ inward, whereby to cause their respective side members 5$^b$ 5$^b$ to spread sufficient to disengage the transverse recesses 3$^c$ 3$^c$ in the stud or spindle 3$^d$, as clearly indicated in dotted lines in Fig. 4, when it is desired to disconnect the holder 3 from the clip member 2.

To hold the member 5 flatwise against the under side of the clip-base 2, and yet permit of the desired spreading of the members 5$^b$ 5$^b$, the front end of the base member 2 has an integral pendent lug 20, which is formed with a forwardly-projecting nose or extension 20$^a$, that projects under and beyond the crossed portions of the members 5$^c$, as shown.

By providing a locking device constructed and coöperatively connected with the clip-base 2, as shown and described, no special means is required for securing the said locking device in its desired position, as the clip-holding nut 2$^c$ firmly secures the said lock 5 at one end, while the nose-piece 20$^a$ holds the other or free end of the lock up against the bottom of the said base 2.

From the foregoing description, taken in connection with the accompanying drawings, it is believed that the manner in which my improved coupling device is manipulated and its advantages will be readily understood.

To connect the thill or pole, it is only necessary to insert the spindle or stud 3$^d$ of the holder 3 down into the aperture 2$^d$ in the clip member 2, when the weight of the thill forces the beveled end of the stud down between the parallel ends 5$^b$ of the lock-spring 5, which then snaps into the grooves in the lower end of the stud, and thereby firmly locks the thill-holder 3 to the clip-piece 2. To remove the thill, it is only necessary to press the ends 5$^c$ of the member, 5 together, which spreads the members 5$^b$, when the holder 3, together with the thill, is easily removed.

In Fig. 5 I have illustrated a slightly-modified form of my invention in which a single spring member 50 is used, the outer end of which projects beyond the front end of the clip-bar 2, while the inner end is bent flatwise, as at 50$^a$, and apertured, so as to lie flatwise against the bottom of the member 2 and to fit over the clip-finger that receives the nut 2$^c$, which holds the said spring 50 in proper position.

Fig. 6 illustrates a further modification of of my invention in which the locking-spring is of substantially the same form as that shown in Figs. 2, 3, and 4, except that instead of being bent upon itself to produce two locking members for engaging the opposite side of the grooved shank on the part 3 it consists of a single member 50$^a$, whose rear end is fixedly secured by a clip-nut 2$^c$ and a depression 2$^e$, in which the part 50$^x$ of the single spring member seats, and the front end of the said single spring member is bent at right angles to form a single locking portion 50$^z$, that engages with the groove in the front face of the spindle or stud on the member 3, as clearly shown in Fig. 6.

Instead of pivotally connecting the locking member 5, as shown in Fig. 4, and securing it by one of the clip-nuts 2$^c$ the said spring member 5 may be secured by means of claws 25, formed on the rear end of the clip portion 2, as clearly shown in Fig. 7.

Having thus described my invention, what I claim, and desire to secure by Letters Patent, is—

1. In a coupling means as described, the combination with the axle-clip; of a holder provided with apertured ears to receive the apertured thill, said holder having a pendent stud, the axle-clip having an extension provided with an aperture to receive the said holder-stud, and an automatic actuating means arranged to be secured by one of the clip-nuts and adapted to interlock with the spindle-stud when it is slipped through the aperture in the extension of the clip, as stated.

2. As an improvement in thill or pole couplings, the combination with the axle-clip member, having an extension provided with an aperture; of a holder formed of a body portion having upwardly-projecting apertured ears adapted to receive the apertured end of the thill or pole, said body portion having a pendent stud adapted to fit through the aperture in the clip member, said stud being of a length to project below the said clip member and having transverse grooves in the opposite faces of its projected portions, and a spring device mounted upon the under side of the clip-member having one end arranged to be clamped by one of the clip-securing nuts having its free end adapted to automatically interlock with the grooves in the holder-stud, said locking device having a portion projected beyond the front end of the apertured clip member, as set forth.

3. As an improvement in pole-couplings, the combination with an axle-clip-base member, having an extension provided with an aperture, and a thill-holder having a pendent stud adapted to be projected down through the aperture in the clip-base member, said stud having a side groove in its lower end; of a spring locking device mounted upon the under side of the clip-base member, said locking device consisting of a stout spring-wire bent upon itself, the free ends being formed into parallel members 5$^b$, arranged to straddle the beveled edges of the stud, and to automatically engage the grooves in the stud when the latter is forced down between the said members 5$^b$, and said members 5$^b$ being extended beyond the front end of the clip-base 2 and bent laterally in opposite directions to form finger-pieces, the loop end of the said spring member being clamped by one of the clip-nuts, said base member having a pendent lug formed with the nose that projects under the cross portions of the laterally-extended ends of the spring-lock, all being arranged substantially as shown and described.

4. The combination with a thill-coupling 1, the clip-base member 2, the latter having an extension at its forward end and provided with an aperture, and with a transverse groove at its under side at the rear end, and provided at its front end with a pendent lug formed with the forwardly-extending nose-piece; of a holder 3 provided with a pendent stud adapted to project down through the aperture in the clip-base 2, said stud having its lower end beveled and provided with grooves in its sides at a point just above its beveled end; of a locking device mounted upon the under face of the clip member 2 adapted to automatically interlock with the stud, said locking device consisting of a single piece of spring-wire bent upon itself to form a U-shaped portion $5^a$, parallel members $5^b$ adapted to straddle the stud and to spring into engagement with the grooves in the sides thereof and having the ends terminating in laterally-projected finger-pieces $5^c$, the said finger-pieces being disposed over the nose-piece of the lug on the base 2, the loop end of the U-shaped member fitting a transverse groove in the rear end of the base member 2 and clamped therein by the clip-nut at either end.

JOEL E. ACKERMAN.

Witnesses:
   E. J. GRISWOLD,
   FRED ACKERMAN.